United States Patent [19]

Prudence

[11] 3,949,020

[45] Apr. 6, 1976

[54] THERMOPLASTIC BLOCK POLYMERS

[75] Inventor: Robert T. Prudence, Akron, Ohio

[73] Assignee: The Goodyear Tire & Rubber Company, Akron, Ohio

[22] Filed: Sept. 3, 1974

[21] Appl. No.: 502,592

[52] U.S. Cl. ............ 260/879; 260/83.7; 260/94.2 M
[51] Int. Cl. C08f 236/04; C08f 297/04; C08f 236/06
[58] Field of Search ..................................... 260/879

[56] References Cited
UNITED STATES PATENTS 3,363,659    1/1968    Keckler et al. ................. 260/879 X
3,639,517    2/1972    Kitchen et al. ..................... 260/879

*Primary Examiner*—William F. Hamrock
*Attorney, Agent, or Firm*—F. W. Brunner; J. Y. Clowney

[57] ABSTRACT

A method of preparation and the composition of thermoplastic block polymers wherein divinylbenzene is added with the diolefin monomer to a polystyryllithium initiator to prepare a unique block polymer having good physical characteristics and low gel.

7 Claims, No Drawings

THERMOPLASTIC BLOCK POLYMERS

This invention is directed to the preparation and the composition of thermoplastic block polymers. More particularly, this invention is directed to a method of preparing thermoplastic block polymers using divinylbenzene (DVB) as a coupling agent and to the block polymers that are prepared by this process. By "coupling" is meant the joining of two or more polymer chains to form a single molecule.

The art of preparing block polymers using lithiated catalyst systems is well documented in the prior art. The preparation of block polymers by prior art methods has given rise to a type of polymer that can be heated, then molded or shaped and allowed to cool to a hard, tough, usable material.

The use of lithium as an initiator results in a polymer chain that is described as "living". By the term "living polymer" is meant the product of a polymerization which has no termination or transfer reaction. Thus, the polymer chains have lithium atoms attached to the chain and even when all the monomer is consumed, if additional monomer is added, the polymerization will continue with the new monomer adding on to the already existing chains until it also is consumed. Thus, in the simplest case possible, in using the usual coupling agents, two living polymers, 2(A-B-), can be coupled to give a polymer having a molecular weight equal to the sum of the two polymers (A-B-B-A). With a living polymer system, it is necessary to have a system free of impurities in order to avoid termination of the growing polymer chain with adventitious impurities in the usual couplers. There is much in the prior art on coupling living polymers using coupling agents. Also, there are many problems associated with coupling polymers in a living polymer system. When coupling a lithiated system the most serious concern of those skilled in the art is that a di-block polymer (A-B) will result rather than many block segments being connected by the coupling agent, if the lithium should prefer to react with some other material, i.e. an impurity, rather than with the coupling agent.

The present invention overcomes the problems of impurities entering into the system by an unobvious and novel method of block polymer preparation. It is an object of the present invention, therefore, to use a method whereby the polymerization system is not exposed to impurities in that the coupling agent is introduced into the polymerization system at the beginning of the diolefin polymerization rather than after the living polydiolefin chains have been formed and therefore susceptible to premature termination.

In the present invention, the divinylbenzene is added with the diolefin to the polystyryl lithium initiator. Thus, if there is any prematurely terminated polymer, it will be polystyrene and not the polystyrene-polydiolefin block polymer (A-B). The advantage of doing this is that it is well known that the polystyrene block polymer does not reduce the physical properties of the final block polymer whereas the presence of diblock polymers (A-B) does reduce the physical properties of the final block polymer.

Accordingly, there is provided a method for preparing thermoplastic block polymers by contacting diolefinic monomers mixed with a suitable amount of divinylbenzene under solution polymerization conditions with a polystyryllithium catalyst, thereby resulting in formation of a thermoplastic block polymer that is nongelled and has the divinylbenzene coupling agent attached to the diolefinic portion of the block polymer.

The number of branches in any given example would depend upon the molar ratio of divinylbenzene to lithium.

The polymerization reaction is usually carried out in an inert solvent such as a hydrocarbon. It has been found, however, that all hydrocarbons will not be conducive for the practice of the instant invention. Some hydrocarbons that can be utilized in this invention are benzene, toluene, cyclohexane, cyclopentane and methylcyclopentane.

If the coupling agent (DVB) were introduced to the diolefin solution prior to contacting with the polystyryllithium initiator it would be expected that a large amount of gelled material would be built into the polymer. Since the nature of branching agents is multifunctional, the incorporated divinylbenzene (DVB) would contain a residual double bond which would be susceptible to crosslinking. However, it has been unexpectedly discovered that the block polymer produced by the method of this invention is not appreciably crosslinked or gelled and that most of the branching agent is found on the end of the diolefin block. The terminal lithium-anion may react with the pendant vinyl groups on the DVB present in one or more polymer chain to give a thermoplastic block polymer.

The polystyryllithium catalysts useful in the practice of this invention are any that correspond to the formula RLi, in which R is polystyrene prepared by reacting alkyllithium with a styrene monomer solution forming polystyrene with a lithium atom at one end of the styrene chain. The alkyllithiums which can be utilized in the instant invention are n-butyllithium, secondary butyllithium, isopropyllithium, amyllithium, etc. Similarly, substituted styrenes such as p-methylstyrene, p-t-butylstyrene, or other substituted styrenes may be used in place of styrene. For instance, if a styrene-butadiene block polymer branched at the terminal end of the polybutadiene block to other styrene-butadiene units is to be prepared, the n-butyl lithium is reacted with a styrene solution to make a polystyryl lithium catalyst which can then be added to a butadiene solution containing the branching agent and polymerizing the butadiene solution until the desired block polymer is formed.

It should be understood that the molecular weight of the polystyrene (R) in the polystyryllithium catalyst can be determined by one skilled in the art and therefore no specific molecular weight need be set down.

The monomers that can be utilized in this invention with the polystyryllithium catalyst to produce the thermoplastic block polymers are diolefins containing from four carbon atoms to about 12 carbon atoms such as isoprene, piperylene, ethyl butadiene, 2,3-dimethyl butadiene, butadiene and the like.

In prior art methods of coupling lithium terminated block polymers, a very exact stoichiometry must be maintained between the coupling agent and the terminal polymer lithium. In those methods, the coupling agent is added after the formation of the (still living) lithium terminated (A-B-) block polymer. Extreme care must be taken that terminating impurities in the coupling agent are absent or are not introduced with it. Otherwise, terminated di-block polymers will result. Likewise, a deficiency or excess of coupling agent, such as $SiCl_4$ or $CHCl_3$, will also result in di-block polymer.

It is widely known to those skilled in the art that even small amounts of di-blocks will significantly reduce the tensile strength of the coupled block polymer.

In the instant invention, the need to maintain an extremely strict stoichiometry between the coupling agent and the active terminal lithium has been eliminated. The coupling agent/active lithium ratio can range from about 0.5/1 to about 25/1. A more preferred ratio of coupling agent/active lithium is from about 2/1 to about 10/1.

The molecular weight of the polystyrene block and the molecular weight of the polydiolefin block can range quite broadly. Also, the weight ratio between the polystyrene and the polydiolefin can range quite broadly. The polystyrene block molecular weight can range from about 7,000 to about 50,000. The polydiolefin block molecular weight, ignoring the effect of DVB, can range from about 10,000 to about 100,000. It should be understood that one skilled in the art could adjust these molecular weight limitations and ratios to produce a host of materials ranging from soft, relatively weak (tensile at break 500 p.s.i.) adhesive substrates, through tough thermoplastic elastomers, to plastics. Because these materials are branched, they are more easily processed than their linear counterparts.

The practice of this invention is further illustrated by reference to the following examples which are intended to be representative rather than restrictive of the scope of this invention.

EXAMPLE I

Polystyryllithium of 12,500 molecular weight was prepared by polymerizing styrene with secondary butyl lithium. Two hundred (200) milliliters (Ml.) of styrene and 700 milliliters of cyclohexane were passed through silica gel and sparged with nitrogen gas. Afterwards there was contained 32.3 grams of styrene in 170 Ml. of solution. To this total solution was added 2.6 Ml. of 1.05 normal secondary butyl lithium and polymerization resulted in a polystyryllithium of molecular weight 12,500 and 0.01521 normality.

Liquified butadiene (350 Ml.) and 2650 Ml. of cyclohexane were passed through silica gel and sparged with nitrogen gas resulting in a solution having 8.4 grams of butadiene per 165 Ml. solution.

To each bottle of butadiene solution (containing 8.4 grams of butadiene per 165 Ml. of solution) was added 0.4 Ml. of 0.2 normal secondary butyl lithium to act as a scavenger after having added 0.30 Ml. of DVB (3.78 molar of a 55 percent solution of DVB dried over calcium sulfate giving a DVB/lithium ratio equal to 5). Subsequently there was added 15 Ml's of the above prepared polystyryllithium to give a kinetic polybutadiene molecular weight of 40,000, ignoring the effect of the DVB. The solution was allowed to react for 40 minutes at 65°C. after which a methanol solution of a phenolic antioxidant was added to the reaction mixture to kill the reaction. The polymer was isolated, air dried, then vacuum dried to give approximately 99.6 percent yield. The polymer was clear and colorless, had a DSV of 1.10, percent gel of 3.8. The polymer was freely soluble in benzene and THF. When molded or remolded at 300°F. the polymer had tensile strength of 2840 p.s.i. at 905 percent elongation.

EXAMPLE II

A solution of 350 Ml. of freshly distilled isoprene in 2650 Ml. of cyclohexane was passed through a silica gel column under nitrogen pressure. To several 8-ounce polymerization bottles was added 165 Mls. of this isoprene solution which contained after nitrogen sparging 9.2 grams of isoprene. To each polymerization bottlex was added two equivalents, based on lithium, of divinyl benzene (0.069 Mls. of a 3.78 molar solution). Then was added 0.4 Mls. of a 0.2 normal secondary butyl lithium solution which served to scavenge residual impurities in the polymerization solution. To the polymerization solution was then added 7.52 Mls. of a 0.01723 normal polystyryl lithium (12,500 molecular weight) solution under a nitrogen atmosphere. Neglecting the effect of divinyl benzene the level of polystyryl lithium would produce a polyisoprene block of 71,000 molecular weight. The polymerization bottles were closed and placed in a 65°C. bath and tumbled end-over-end for 1½ hours. The bottles were then cooled to room temperature and terminated with a methanol solution containing one part of a phenolic antioxidant. The polymer was isolated and air dried, then vacuum dried to give better than a 99 percent yield. The polymer had a DSV of 2.05 and contained 2.2 percent gel. The polymer had a strength at break of 2844 p.s.i. and 1385 percent elongation. Molding conditions for the tensile sample were 300°F./20 minutes with rapid cooling under pressure. By the term "nongelled" is meant block polymers having less than 5 percent gel.

While certain representative embodiments and details have been shown for the purpose of illustrating the invention, it will be apparent to those skilled in this art that various changes and modification may be made therein without departing from the spirit or scope of the invention.

What is claimed is:

1. A process for the preparation of thermoplastic block polymers by contacting conjugated diolefinic monomers mixed with an amount of divinylbenzene under solution polymerization conditions with a polystyryl lithium catalyst, said amount of divinylbenzene varying from about 2/1 to about 10/1 of divinylbenzene/active lithium ratio, whereby resulting in a thermoplastic block polymer that is non-gel and has the divinylbenzene coupling agent attached to the diolefinic portion of the polymer block.

2. A thermoplastic block polymer product by the process of contacting conjugated diolefinic monomers mixed with a suitable amount of divinylbenzene under solution polymerization conditions with a polystyryl lithium catalyst, said amount of divinylbenzene being from 2/1 to 10/1 moles of divinylbenzene per mole of active lithium catalyst, whereby resulting in a thermoplastic block polymer that is non-gel and has the divinylbenzene coupling agent attached to the diolefinic portion of the block polymer.

3. A process for the preparation of thermoplastic block polymers by contacting conjugated diolefinic monomers mixed with an amount of divinylbenzene under solution polymerization conditions with a polystyryl lithium catalyst, said amount of divinylbenzene varying from about 0.5/1 to 25/1 of divinylbenzene/active lithium ratio, whereby resulting in a thermoplastic block polymer that is non-gel and has the divinylbenzene coupling agent attached to the diolefinic portion of the polymer block.

4. A method according to claim 3 wherein the conjugated diolefinic monomer contains from 4 to about 12 carbon atoms and is selected from the group consisting of isoprene, piperylene, ethyl butadiene, 2,3-dimethylbutadiene and butadiene.

5. A method according to claim 3 wherein the polystyryllithium catalyst is prepared by reacting an alkyl lithium compound with a styrene monomer selected from the group of styrene, p-methylstyrene and p-t-butylstyrene.

6. A method according to claim 4 wherein the alkyl lithium compound is selected from the group of n-butyllithium, secondary butyllithium, isopropyllithium and amyllithium.

7. A thermoplastic block polymer product produced by the process of contacting conjugated diolefinic monomers mixed with a suitable amount of divinylbenzene under solution polymerization conditions with a polystyryl lithium catalyst, said amount of divinylbenzene being from 0.5/1 to 25/1 moles of divinylbenzene per mole of active lithium catalyst, whereby resulting in a thermoplastic block polymer that is non-gel and has the divinylbenzene coupling agent attached to the diolefinic portion of the block polymer.

* * * * *